United States Patent
Ogawa et al.

(10) Patent No.: US 6,216,630 B1
(45) Date of Patent: Apr. 17, 2001

(54) BEARING ARRANGEMENT AND INDICATING INSTRUMENT USING THE SAME

(75) Inventors: Naoto Ogawa, Kariya; Takashi Koumura, Toyota, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/190,852

(22) Filed: Nov. 12, 1998

(30) Foreign Application Priority Data

Nov. 20, 1997 (JP) .................................................. 9-319805
Jun. 19, 1998 (JP) .................................................. 10-173510

(51) Int. Cl.$^7$ .............................. G09F 9/00; F16C 33/74; F16C 33/10; G01D 7/02; G01R 1/10
(52) U.S. Cl. .......................... 116/284; 384/132; 384/286; 73/866.1; 324/154 PB
(58) Field of Search ............................ 116/284, 286–289; 384/132, 286, 289, 291, 322, 397; 324/154 PB; 73/866.1; 368/324

(56) References Cited

U.S. PATENT DOCUMENTS

| 2,371,511 | * | 3/1945 | Faus ...................................... 116/284 |
| 4,397,571 | * | 8/1983 | Morrill .................................. 384/397 |
| 4,558,960 | * | 12/1985 | Lehtinen et al. ...................... 384/286 |
| 4,726,693 | * | 2/1988 | Anderson et al. ..................... 384/291 |
| 5,095,266 | * | 3/1992 | Ohike et al. .......................... 116/284 |
| 5,267,526 | * | 12/1993 | Totsuka ................................ 116/291 |
| 5,423,612 | * | 6/1995 | Zang et al. ........................... 384/132 |
| 5,767,425 | * | 6/1998 | Miyagawa et al. ................. 73/866.1 |
| 5,806,987 | * | 9/1998 | Nose et al. ........................... 384/132 |

FOREIGN PATENT DOCUMENTS

| 2625311 | 6/1989 | (FR) . |
| 5-87833 | 4/1993 | (JP) . |
| 7-941 | 1/1995 | (JP) . |

OTHER PUBLICATIONS

Patent Abstracts of Japan, vol. 009, No. 294, Nov. 20, 1985 & JP 60 132125A (Kayo Seiko KK), Jul. 15, 1985.

* cited by examiner

Primary Examiner—Diego Gutierrez
Assistant Examiner—Stanley J. Pruchnic, Jr.
(74) Attorney, Agent, or Firm—Pillsbury Winthrop LLP

(57) ABSTRACT

In a bearing arrangement, a rotary shaft has an annular groove opposite a bearing portion so that a part of the annular groove extends outward from the bearing portion, and lubrication oil is disposed between the rotary shaft and the bearing portion.

9 Claims, 3 Drawing Sheets

BEARING ARRANGEMENT AND INDICATING INSTRUMENT USING THE SAME

CROSS REFERENCE TO RELATED APPLICATION

The present application is based on and claims priority from Japanese Patent Applications Hei 9-319805 filed on Nov. 20, 1997 and Hei 10-173510 filed on Jun. 19, 1998, the contents of which are incorporated herein by reference.

BACKGROUND OF THE INVENTION

1. Field of the Invention

The present invention relates to a bearing arrangement of an indicating instrument, particularly, a cross-coil type indicating instrument for a vehicle.

2. Description of the Related Art

In order to meet demands of reduction in size and of increase in accuracy, cross-coil-type indicating instruments have been adopted to vehicles. Such a cross-coil-type indicating instrument has a bobbin for cross coils, and a bearing for supporting a pointer shaft is formed at a central portion of the bobbin. Lubrication oil such as silicone oil is put between the bearing and the pointer shaft to reduce friction therebetween.

The bobbin is usually formed from a resinous material by an injection molding machine. However, it is difficult to form the bearing by the molding machine directly because burs or edges may be formed on the inner periphery of the bearing. Such burs or edges are obstacle to the lubrication.

SUMMARY OF THE INVENTION

A main object of the invention is to provide an improved bearing arrangement of an indicating instrument which can be formed by an injection molding machine.

Another object of the invention is to provide an indicating instrument using an improved bearing arrangement made of a resinous mold.

In a bearing arrangement of a device according to a main aspect of the invention, a rotary shaft has an annular groove at a portion thereof opposite the bearing portion so that a part of the annular groove extends outward from the bearing portion, and lubrication oil is disposed between the rotary shaft and the bearing portion.

BRIEF DESCRIPTION OF THE DRAWINGS

Other objects, features and characteristics of the present invention as well as the functions of related parts of the present invention will become clear from a study of the following 'detailed description, the appended claims and the drawings. In the drawings:

DETAILED DESCRIPTION OF THE PREFERRED EMBODIMENTS (First Embodiment)

A bearing arrangement according to a first embodiment of the invention is described with reference to FIGS. 1–4.

Figure 1:
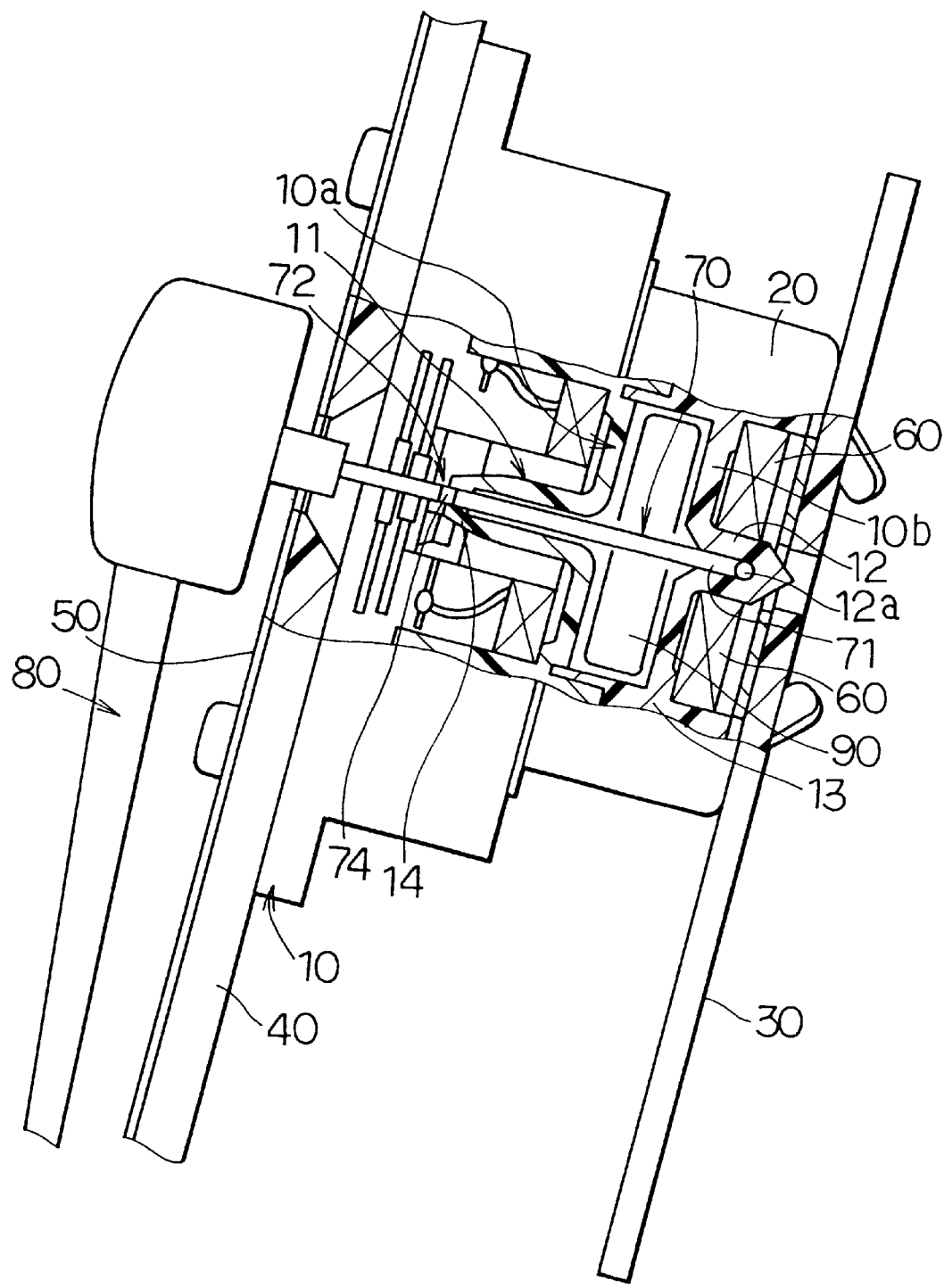
FIG. 1 is a schematic diagram illustrating a main portion of an indicating instrument according to a first embodiment of the invention.
Figure 2:
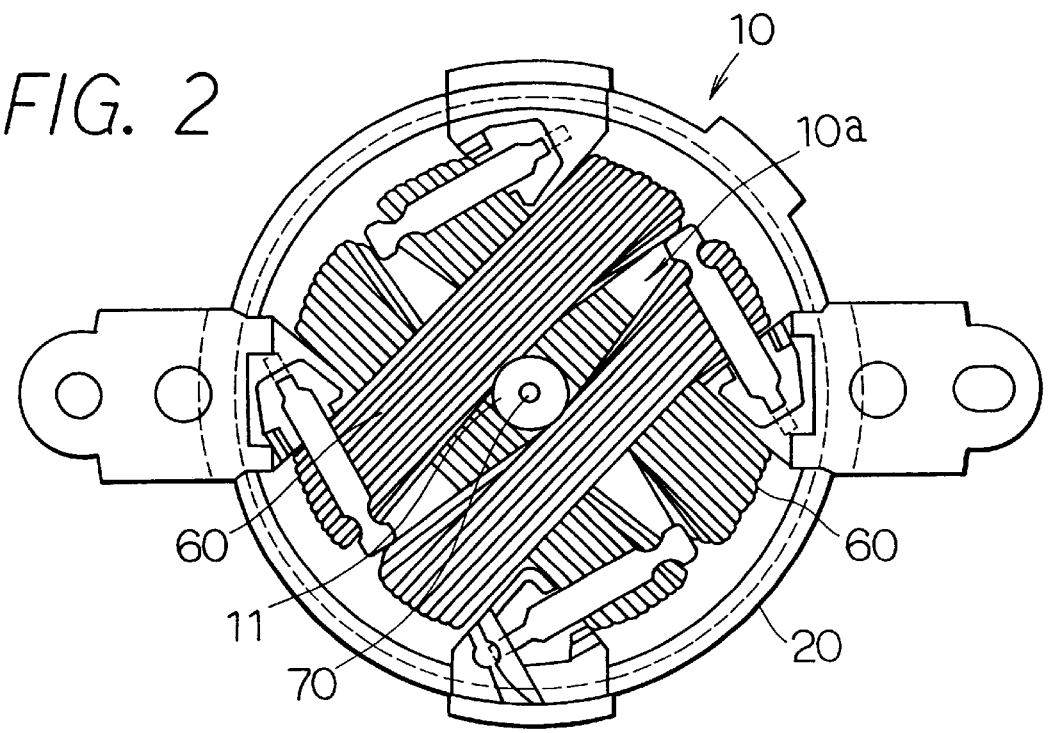
FIG. 2 is a plan view of a portion of the indicating instrument illustrated in FIG. 1 where cross coils and a bobbin are installed under a dial plate.

A cross-coil-type indicating instrument has a hollow bobbin 10, cup-shaped case 20, circuit board 30, light-conducting plate 40, dial plate 50, cross-coil unit 60, pointer shaft 70, pointer 80 and permanent magnet 90 as shown in FIG. 1.

Bobbin 10 is composed of upper bobbin member 10a and lower bobbin member 10b, which are resinous mold formed by an injection molding machine. Bobbin 10 has inner cylindrical portions 11, 12 and outer cylindrical portion 13. Lower bobbin member 10b is held in case 20 and fixed to circuit board 30 together with case 20.

Circuit board 30 has a circuit for driving pointer shaft 70 and pointer 80. Dial plate 50 and light conducting plate 40 are fixed to the upper surface of bobbin 10 by a plurality of screws.

Cross-coil unit 60 is composed of a pair of coils wound around outer cylindrical portion 13 to cross each other. Cross-coil unit 60 rotates pointer shaft 70 in cooperation with permanent magnet 90 when energized from circuit board 30.

Pointer shaft 70 is a metal shaft inserted into the center holes of inner cylindrical portions 11 and 12. The bottom end 71 of pointer shaft 70 is supported by steel ball 12a in the center hole of cylindrical portion 12, and the middle portion 72 of pointer shaft 70 is supported by cylindrical portion 11. Pointer shaft 70 is slightly inclined to the ground while the indicating instrument is installed in a vehicle.

Pointer 80 is fixed to the tip end of pointer shaft 70 to move over dial plate 50 when pointer shaft 70 rotates. Permanent magnet 90 is housed inside outer cylindrical portion 13 to be soaked in damper oil and carried by pointer shaft 70.

Figure 3:
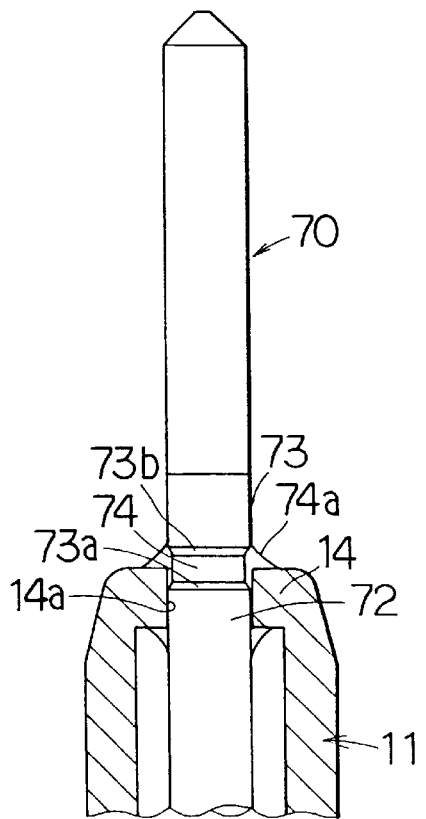
FIG. 3 is an enlarged cross sectional view of a bearing arrangement of the indicating instrument according to the first embodiment.
Figure 4:
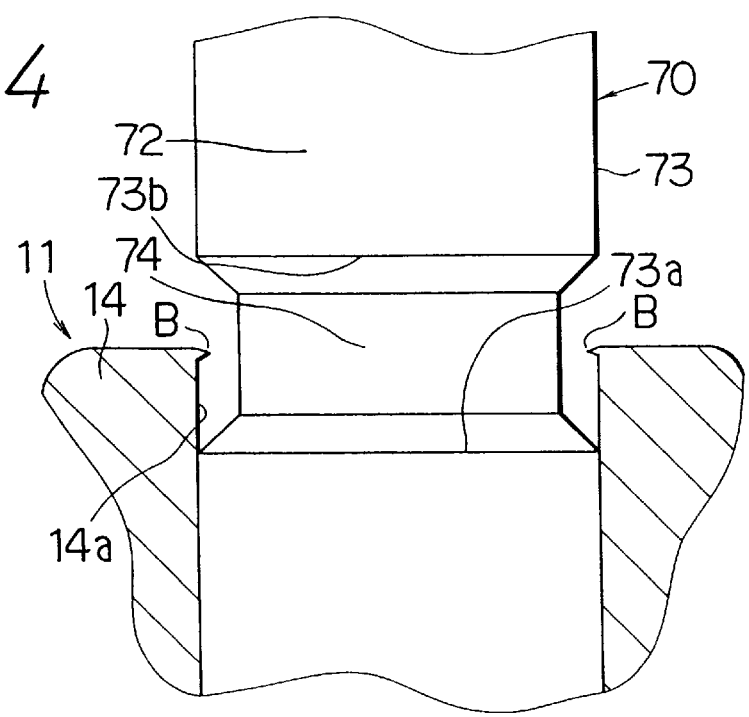
FIG. 4 is an enlarged cross sectional view of the bearing arrangement illustrated in FIG. 3.

As shown in FIGS. 1, 3 and 4, inner cylindrical portion 11 of bobbin 10 has annular bearing portion 14 having inner surface 14a that supports the middle portion 72 at the outer periphery 73 of pointer shaft 70. Thus bearing portion 14 functions as a surface bearing.

As shown in FIG. 3, pointer shaft 70 has annular groove 74 at the portion opposite inner surface 14a of bearing portion 14. Annular groove 74 is disposed so that upper end 73b thereof extends from bearing portion 14 while lower end thereof faces inner surface 14a of bearing portion 14. Lubricating oil such as silicon oil is held in the space between inner surface 14a and annular groove 74 at the lower portion thereof. The depth of annular groove 74 is about 0.05 mm, which is sufficiently larger than size of burs or edge (e.g. 0.02 mm). Thus, a bur or an edge B shown in FIG. 4, which may be formed on inner periphery 14a of bearing portion 14, can not reach the bottom of annular groove 74. As a result, a uniform lubrication oil film can be maintained in the space between inner surface 14a and annular groove 74 at the lower portion thereof. Lubricating oil 74a is also held between the upper surface of bearing portion 14 and the upper portion of annular groove 74 as shown in FIG. 3 due to capillary action and weight thereof. Therefore, the lubrication oil film can be maintained for a long time.

(Second Embodiment)

Figure 5:
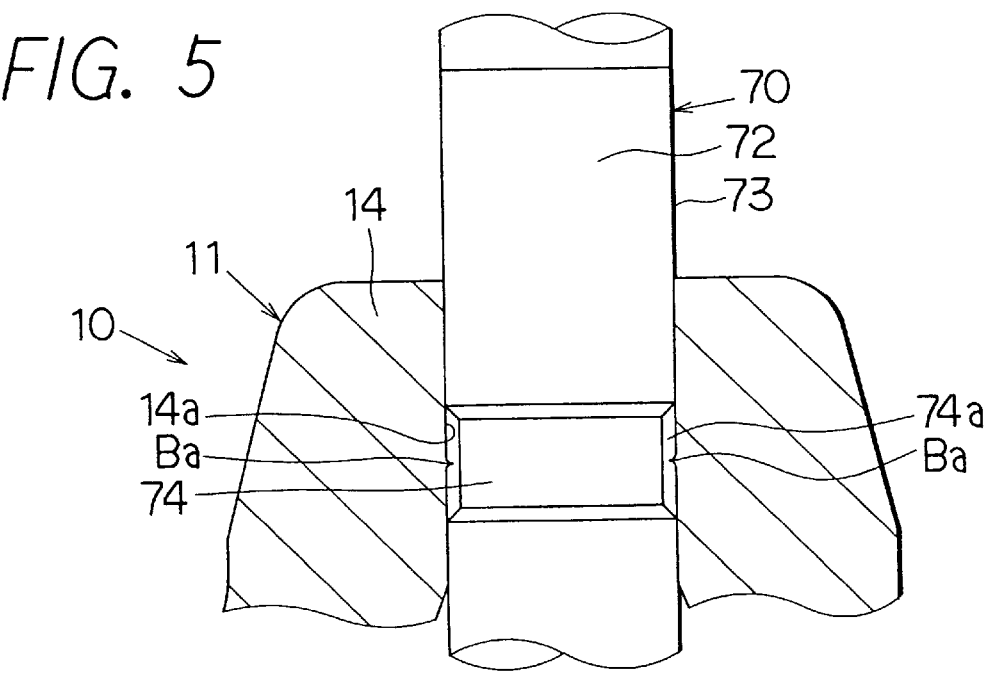
FIG. 5 is an enlarged cross sectional view of a bearing arrangement of the indicating instrument according to a second embodiment of the invention.

A bearing arrangement according to a second embodiment of the invention is described with reference to FIG. 5.

If a bur or an edge Ba is formed at a portion of inner surface 14*a* deep inside bearing portion 14, annular groove 74 is formed on the portion of pointer shaft 70 to receive the bur or edge Ba and hold lubrication oil 74*a*. Other portions are the same as those of the bearing arrangement according to the first embodiment. Lubrication oil 74*a* can be held in the space between inner surface 14*a* and annular groove 74 surely.

The above bearing arrangement can be applied to any bearing portion of a device having a rotating shaft.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A bearing arrangement in combination with a device including a cylindrical member having a bearing portion at a longitudinal end thereof and a rotary shaft extending outward from said bearing portion, wherein the improvement comprises:

said rotary shaft having an annular groove at a peripheral portion thereof opposite said bearing portion, wherein a portion of said annular groove extends outwardly beyond said bearing portion; and lubrication oil disposed between said rotary shaft and said annular groove.

2. The improvement as claimed in claim 1, wherein said annular groove has a depth sufficiently larger than a maximum size of burs formed on said longitudinal end.

3. The bearing arrangement as claimed in claim 2, wherein said depth is about 0.05 mm.

4. The bearing arrangement as claimed in claim 1, wherein said rotary shaft is disposed to be slightly inclined to the ground to hold said lubrication oil by capillary action and weight thereof.

5. An indicating instrument including a rotary shaft, a driving unit for rotating said rotary shaft, a cylindrical housing for said driving unit having a bearing portion at a longitudinal end thereof, and a pointer fixed to said rotary shaft, wherein the improvement comprises:

said rotary shaft having an annular groove at a peripheral portion thereof opposite said bearing portion, wherein a portion of said annular groove extends outwardly beyond said bearing portion; and lubrication oil disposed between said rotary shaft and said annular groove.

6. The bearing arrangement as claimed in claim 5, wherein said annular groove has a depth sufficiently larger than the size of burs.

7. The bearing arrangement as claimed in claim 6, wherein said depth is about 0.05 mm.

8. The bearing arrangement as claimed in claim 5, wherein said rotary shaft is disposed to be slightly inclined to the ground to hold said lubrication oil by capillary action and weight thereof.

9. An indicating instrument comprising:

a rotary shaft;

a driving unit for rotating said rotary shaft;

a cylindrical housing for said driving unit having a bearing portion at a longitudinal end thereof; and a pointer fixed to said rotary shaft, wherein said rotary shaft has an annular groove at a peripheral portion thereof opposite said bearing portion, wherein a portion of said annular groove extends outwardly beyond said bearing portion; and lubrication oil is disposed between said rotary shaft and said annular groove.

* * * * *